United States Patent
Mazurenko et al.

(10) Patent No.: US 9,384,556 B2
(45) Date of Patent: Jul. 5, 2016

(54) IMAGE PROCESSOR CONFIGURED FOR EFFICIENT ESTIMATION AND ELIMINATION OF FOREGROUND INFORMATION IN IMAGES

(71) Applicant: Avago Technologies General IP (Singapore) Pte.Ltd., Singapore (SG)

(72) Inventors: Ivan Leonidovich Mazurenko, Khimki (RU); Denis Vladimirovich Parkhomenko, Mytyschy (RU); Pavel Aleksandrovich Aliseitchik, Moscow (RU); Barrett J. Brickner, Savage, MN (US); Dmitry Nicolaevich Babin, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/661,524

(22) Filed: Mar. 18, 2015

(65) Prior Publication Data
US 2015/0269740 A1  Sep. 24, 2015

(30) Foreign Application Priority Data
Mar. 18, 2014 (RU) .............................. 2014110361

(51) Int. Cl.
| | | |
|---|---|---|
| G06K 9/34 | (2006.01) | |
| G06T 7/00 | (2006.01) | |
| G06K 9/00 | (2006.01) | |
| G06K 9/46 | (2006.01) | |

(52) U.S. Cl.
CPC .......... *G06T 7/0081* (2013.01); *G06K 9/00355* (2013.01); *G06K 9/00375* (2013.01); *G06K 9/469* (2013.01)

(58) Field of Classification Search
None
See application file for complete search history.

(56) References Cited

U.S. PATENT DOCUMENTS

| 5,144,426 | A * | 9/1992 | Tanaka | H04N 19/159 375/240.13 |
|---|---|---|---|---|
| RE37,091 | E * | 3/2001 | Tanaka | H04N 19/159 348/400.1 |
| 7,885,475 | B2 * | 2/2011 | Yang | G06T 7/2006 348/154 |
| 8,457,401 | B2 * | 6/2013 | Lipton | G06K 9/38 382/173 |
| 8,483,481 | B2 * | 7/2013 | Feris | G06K 9/00744 382/164 |
| 8,503,720 | B2 * | 8/2013 | Shotton | G06K 9/00335 382/103 |

(Continued)

OTHER PUBLICATIONS

Ozer et al., "Design of a Real-Time Gesture Recognition System", IEEE Signal Processing Magazine, pp. 57-64, May 2005.*

(Continued)

*Primary Examiner* — Feng Niu

(57) ABSTRACT

An image processing system comprises an image processor having image processing circuitry and an associated memory. The image processor is configured to implement a foreground processing module utilizing the image processing circuitry and the memory. The foreground processing module is configured to obtain one or more images, to estimate a foreground region of interest from the one or more images, to determine a plurality of segments of the foreground region of interest, to calculate amplitude statistics for respective ones of the plurality of segments, to classify respective segments as being respective portions of static foreground objects or as being respective portions of dynamic foreground objects based at least in part on the calculated amplitude statistics and one or more defined patterns for known static and dynamic objects, and to remove one or more segments classified as static foreground objects from the foreground region of interest.

20 Claims, 6 Drawing Sheets

(56) References Cited

U.S. PATENT DOCUMENTS

| | | | |
|---|---|---|---|
| 8,682,063 B2 * | 3/2014 | Wang | G06K 9/6278 382/103 |
| 8,787,663 B2 * | 7/2014 | Litvak | G06K 9/00375 382/165 |
| 8,934,714 B2 * | 1/2015 | Feris | G06K 9/00744 382/173 |
| 8,941,726 B2 * | 1/2015 | Marks | G06T 1/0014 348/61 |
| 9,087,258 B2 * | 7/2015 | Yu | H04N 7/181 |
| 2010/0316257 A1 * | 12/2010 | Xu | G06K 9/00771 382/103 |

OTHER PUBLICATIONS

Zhang et al., "A Vision-based Gesture Recognition System for Human-Robot Interaction", Proceedings of the 2009 IEEE International Conference on Robotics and Biomimetics, Dec. 19-23, 2009, Guilin, China, pp. 2096-2101.*

* cited by examiner

FIG. 9
SKIN FLAG AFTER PROPAGATION
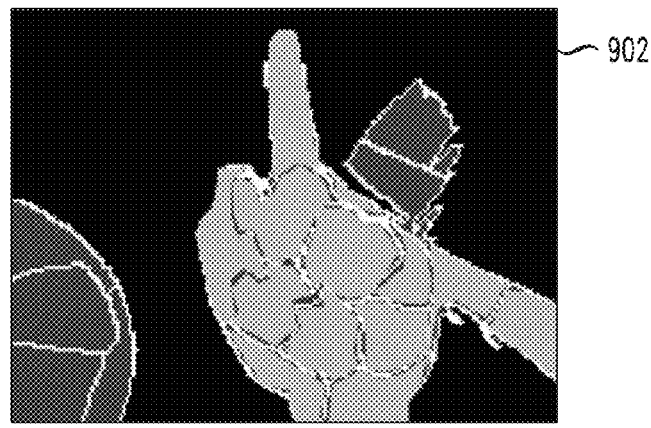
DYNAMIC FLAG AFTER PROPAGATION
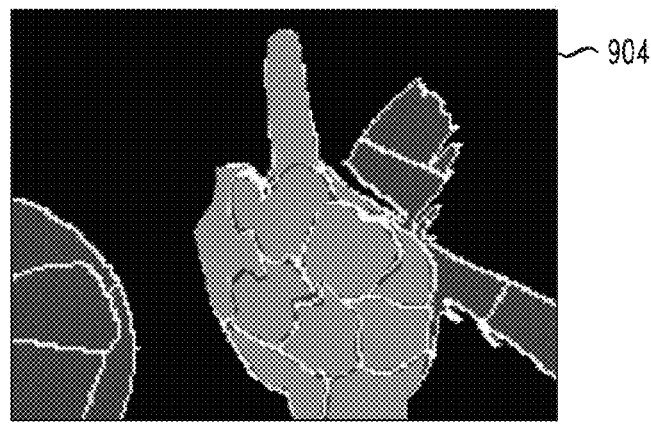
DYNAMIC SKIN FLAG AFTER PROPAGATION
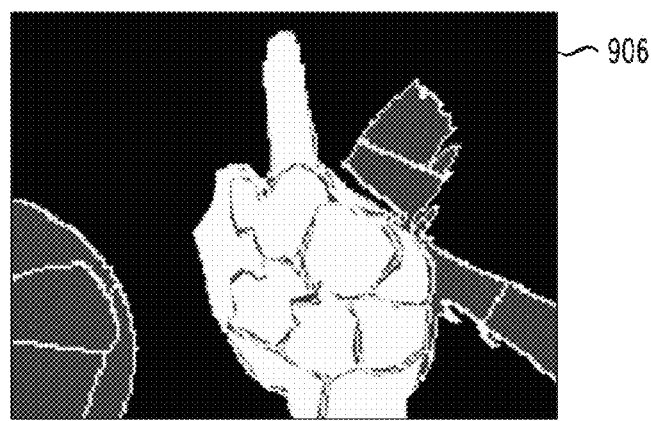

IMAGE PROCESSOR CONFIGURED FOR EFFICIENT ESTIMATION AND ELIMINATION OF FOREGROUND INFORMATION IN IMAGES

FIELD

The field relates generally to image processing, and more particularly to processing of foreground information in images.

BACKGROUND

A wide variety of different techniques are known for processing foreground information in images and image video sequences. Such techniques can produce acceptable results when applied to high-resolution images, such as photographs or other two-dimensional (2D) images. However, many important machine vision applications utilize depth maps or other types of three-dimensional (3D) images generated by depth imagers such as structured light (SL) cameras or time of flight (ToF) cameras. Such images are more generally referred to herein as depth images, and may include low-resolution images having highly noisy and blurred edges.

Conventional foreground processing techniques generally do not perform well when applied to depth images. For example, these conventional techniques often fail to differentiate with sufficient accuracy between foreground static objects and one or more moving objects of interest within a given depth image. This can unduly complicate subsequent image processing operations such as feature extraction, gesture recognition, automatic tracking of objects of interest, and many others.

SUMMARY

In one embodiment, an image processing system comprises an image processor having image processing circuitry and an associated memory. The image processor is configured to implement a foreground processing module utilizing the image processing circuitry and the memory. The foreground processing module is configured to obtain one or more images, to estimate a foreground region of interest from the one or more images, to determine a plurality of segments of the foreground region of interest, to calculate amplitude statistics for respective ones of the plurality of segments, to classify respective segments as being respective portions of static foreground objects or as being respective portions of dynamic foreground objects based at least in part on the calculated amplitude statistics and one or more defined patterns for known static and dynamic objects, and to remove one or more segments classified as static foreground objects from the foreground region of interest.

Other embodiments of the invention include but are not limited to methods, apparatus, systems, processing devices, integrated circuits, and computer-readable storage media having computer program code embodied therein.

BRIEF DESCRIPTION OF THE DRAWINGS

FIG. 9 shows an example of dynamic skin flag propagation.

DETAILED DESCRIPTION

Embodiments of the invention will be illustrated herein in conjunction with exemplary image processing systems that include image processors or other types of processing devices and implement techniques for estimating and eliminating foreground information in images. It should be understood, however, that embodiments of the invention are more generally applicable to any image processing system or associated device or technique that involves processing of foreground information in one or more images.

Figure 1:
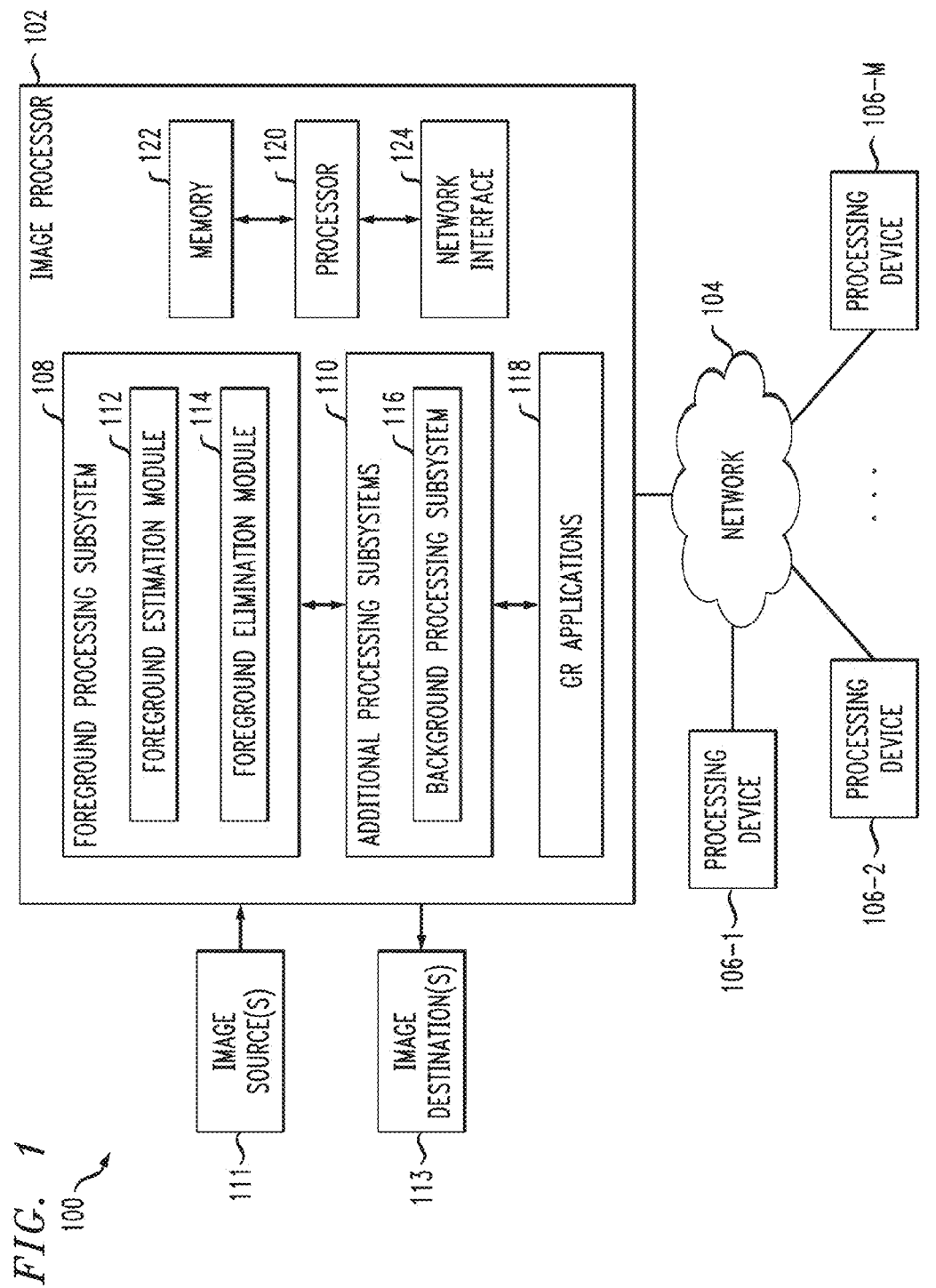
FIG. 1 is a block diagram of an image processing system comprising an image processor implementing a foreground processing subsystem in an illustrative embodiment.

FIG. 1 shows an image processing system 100 in an embodiment of the invention. The image processing system 100 comprises an image processor 102 that is configured for communication over a network 104 with a plurality of processing devices 106-1, 106-2, . . . 106-M. The image processor 102 implements a foreground processing subsystem 108, additional processing subsystems 110 and gesture recognition (GR) applications 118. The foreground processing subsystem 108 in this embodiment process input images from one or more image sources 111 and provides processed images or other information to one or more image destinations 113.

Although the image source(s) 111 and image destination(s) 113 are shown as being separate from the processing devices 106 in FIG. 1, at least a subset of such sources and destinations may be implemented as least in part utilizing one or more of the processing devices 106. Accordingly, images may be provided to the image processor 102 over network 104 for processing from one or more of the processing devices 106. Similarly, processed images may be delivered by the image processor 102 over network 104 to one or more of the processing devices 106. Such processing devices may therefore be viewed as examples of image sources or image destinations.

A given image source may comprise, for example, a 3D imager such as an SL camera or a ToF camera configured to generate amplitude and depth images, or a 2D imager configured to generate grayscale images, color images, infrared images or other types of 2D images. Another example of an image source is a storage device or server that provides images to the image processor 102 for processing.

A given image destination may comprise, for example, one or more display screens of a human-machine interface of a computer or mobile phone, or at least one storage device or server that receives processed images from the image processor 102.

Also, although the image source(s) 111 and image destination(s) 113 are shown as being separate from the image processor 102 in FIG. 1, the image processor 102 may be at least partially combined with at least a subset of the one or more image sources 111 and the one or more image destinations 113 on a common processing device. Thus, for example, a given image source and the image processor 102 may be collectively implemented on the same processing device.

Similarly, a given image destination and the image processor 102 may be collectively implemented on the same processing device.

The foreground processing subsystem 108 includes foreground estimation module 112 and foreground elimination module 114. The foreground estimation module 112 and foreground elimination module 114 are collectively referred to herein as a foreground processing module. The foreground processing subsystem 108 may receive inputs from additional processing subsystems 110 including a background processing subsystem 116. Such additional processing subsystems 110 may comprise image processing subsystems configured to implement functional blocks for input frame acquisition, noise reduction, background estimation and removal, or other types of processing. In some embodiments, the background estimation and removal is implemented via the background processing subsystem 116.

Exemplary noise reduction techniques suitable for use in the additional processing subsystems 110 are described in PCT International Application PCT/US13/56937, filed on Aug. 28, 2013 and entitled "Image Processor With Edge-Preserving Noise Suppression Functionality," which is commonly assigned herewith and incorporated by reference herein.

Exemplary background estimation and removal techniques suitable for use in the additional processing subsystems 110 are described in Russian Patent Application No. 2013135506, filed Jul. 29, 2013 and entitled "Image Processor Configured for Efficient Estimation and Elimination of Background Information in Images," which is commonly assigned herewith and incorporated by reference herein.

It should be understood, however, that these particular functional blocks are exemplary only, and other embodiments of the invention can be configured using other arrangements of additional or alternative functional blocks.

The foreground processing subsystem 108 may provide information, such as processed images or frames, for use in GR applications 118. The configuration of such information is adapted in accordance with the specific needs of a particular GR application. Such information, as discussed above, may be provided to one or more image destinations 113 including processing devices 106. In some embodiments, at least a portion of the GR applications 118 is implemented at least in part on one or more of the processing devices 106.

In the present embodiment, the foreground processing subsystem 108 of image processor 102 is configured to perform foreground estimation using foreground estimation module 112 and to perform foreground elimination using foreground elimination module 114 on one or more images from a given image source. The resulting image is then subject to additional processing operations such as processing operations associated with feature extraction, gesture recognition, object tracking or other functionality implemented in the additional processing subsystems 110 of the image processor 102.

The images processed in the image processor 102 are assumed to comprise amplitude and depth images generated by a depth imager such as an SL camera or a ToF camera. In some embodiments, the image processor 102 may be at least partially integrated with such a depth imager on a common processing device. Other types and arrangements of images may be received and processed in other embodiments.

The particular number and arrangement of modules and subsystems shown in image processor 102 in the FIG. 1 embodiment can be varied in other embodiments. For example, in other embodiments two or more of these modules and subsystems may be combined into a lesser number of modules. An otherwise conventional image processing integrated circuit or other type of image processing circuitry suitably modified to perform processing operations as disclosed herein may be used to implement at least a portion of one or more of the subsystems and modules 110, 112, 114, and 116 of image processor 102.

The operation of the foreground processing subsystem 108 will be described in greater detail below in conjunction with the flow diagram of FIG. 2. This flow diagram illustrates an exemplary process for estimating and eliminating foreground information in one or more amplitude or depth images provided by one of the image sources 111.

A modified image in which certain foreground information has been eliminated in the image processor 102 may be subject to additional processing operations in the image processor 102, such as, for example, feature extraction, gesture recognition, or any of a number of additional or alternative types of processing, such as automatic object tracking.

Alternatively, a modified image or other information derived therefrom generated by the image processor 102 may be provided to one or more of the processing devices 106 over the network 104. One or more such processing devices may comprise respective image processors configured to perform the above-noted additional processing operations such as feature extraction, gesture recognition and automatic object tracking.

The processing devices 106 may comprise, for example, computers, mobile phones, servers or storage devices, in any combination. One or more such devices also may include, for example, display screens or other user interfaces that are utilized to present images generated by the image processor 102. The processing devices 106 may therefore comprise a wide variety of different destination devices that receive processed image streams from the image processor 102 over the network 104, including by way of example at least one server or storage device that receives one or more processed image streams from the image processor 102.

Although shown as being separate from the processing devices 106 in the present embodiment, the image processor 102 may be at least partially combined with one or more of the processing devices 106. Thus, for example, the image processor 102 may be implemented at least in part using a given one of the processing devices 106. By way of example, a computer or mobile phone may be configured to incorporate the image processor 102 and possibly a given image source. The image source(s) 111 may therefore comprise cameras or other imagers associated with a computer, mobile phone or other processing device. As indicated previously, the image processor 102 may be at least partially combined with one or more image sources or image destinations on a common processing device.

The image processor 102 in the present embodiment is assumed to be implemented using at least one processing device and comprises a processor 120 coupled to a memory 122. The processor 120 executes software code stored in the memory 122 in order to control the performance of image processing operations. The image processor 102 also comprises a network interface 124 that supports communication over network 104. The network interface 124 may comprise one or more conventional transceivers. In other embodiments, the image processor 102 need not be configured for communication with other devices over a network, and in such embodiments the network interface 124 may be eliminated.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The memory 122 stores software code for execution by the processor 120 in implementing portions of the functionality of image processor 102, such as the subsystems 108, 110 and 116 and the GR applications 118. A given such memory that stores software code for execution by a corresponding processor is an example of what is more generally referred to herein as a computer-readable storage medium having computer program code embodied therein, and may comprise, for example, electronic memory such as random access memory (RAM) or read-only memory (ROM), magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

It should also be appreciated that embodiments of the invention may be implemented in the form of integrated circuits. In a given such integrated circuit implementation, identical die are typically formed in a repeated pattern on a surface of a semiconductor wafer. Each die includes an image processor or other image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

For example, in some embodiments, the image processing system 100 is implemented as a video gaming system or other type of gesture-based system that processes image streams in order to recognize user gestures. The disclosed techniques can be similarly adapted for use in a wide variety of other systems requiring a gesture-based human-machine interface, and can also be applied to other applications, such as machine vision systems in robotics and other industrial applications that utilize gesture recognition.

Some embodiments provide techniques for the identification, classification and removal of objects from a foreground of a region of interest (ROI) of one or more images. A wide variety of methods exist for removing background information from input images to select a foreground ROI where objects of interest are located. For example, background processing subsystem 116 may exclude from a foreground ROI objects in an image which are located at a distance greater than some threshold value. The resulting image is a foreground ROI for processing in the foreground processing subsystem 108. The foreground processing subsystem 108 in some embodiments exclude from the foreground ROI one or more foreground static objects that are located close to a camera sensor. In some embodiments, local area classification based on temporal and lateral statistical characteristics is used for foreground static object removal.

The operation of the foreground processing subsystem 108 of image processor 102 will now be described in greater detail with reference to the diagrams of FIGS. 2 through 9.

Figure 2:
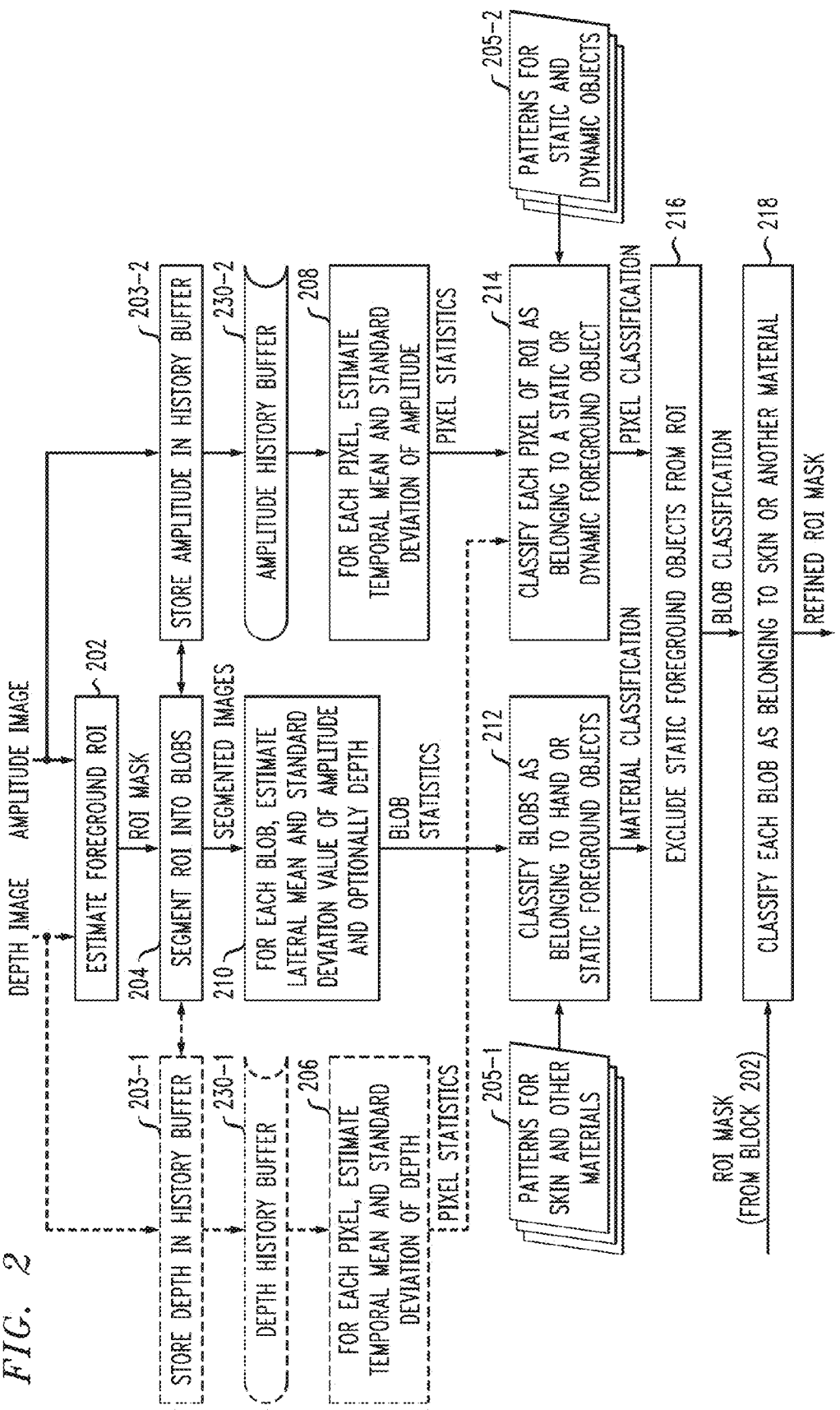
FIG. 2 is a flow diagram of an exemplary foreground estimation and elimination process performed by the foreground processing subsystem in the image processor of FIG. 1.

FIG. 2 shows a process of foreground processing which may be implemented by the foreground processing subsystem 108. The process begins in block 202, where a foreground ROI is estimated from an amplitude image and optionally a depth image. Such images may be obtained from one or more image sensors. Examples of such image sensors include SL and ToF image sensors which produce both amplitude and depth information, or an active lighting infrared image sensor that produces only amplitude information. A wide variety of other types of image sensors providing different types of image output at fixed or variable frame rates can also be used.

Luminance images are an example of one type of amplitude image. Luminance images are typically provided in the form of a rectangular matrix of picture elements or "pixels" having respective positive integer or floating values, although other luminance image formats could be used. Embodiments, however, are not limited solely to use with luminance images. Instead, a wide variety of other intensity images or more generally amplitude images may be used. The term "amplitude image" as used herein is intended to be broadly construed so as to encompass a luminance image, intensity image or other type of image providing amplitude information. As noted above, such amplitude information for a given amplitude image is typically arranged in the form of a rectangular array of pixels.

In some embodiments, the foreground ROI estimation in block 202 uses a depth image in addition to the amplitude image, as indicated by the dashed line in FIG. 2. Depth images may be used as a supplement to luminance images or other types of amplitude images in order to facilitate the foreground elimination and removal processing. A depth image may be provided in the form of a depth map in the form of a rectangular array of pixels indicating depth information for respective ones of the pixels.

It is to be appreciated that the amplitude and depth images need not be provided from different image sensors. For example, image sensors in some embodiments may provide amplitude information in the form of a grayscale image or other type of intensity image, where the image sensor also generates depth information. An amplitude image of this type may be considered as part of the depth image or may be implemented as a separate image that corresponds to a depth image. Other types and arrangements of amplitude and depth images comprising amplitude information and associated depth information may be used in other embodiments.

As described above, in some embodiments the amplitude and depth images provided by image source(s) 111 are represented as respective rectangular matrices. If both the amplitude and depth image come from the same image sensor, the amplitude and depth images will typically have the same height and width. In a more general case, the amplitude and depth images have different sizes. In some embodiments, special calibration and mapping processing is performed in block 202 to find the correspondence between pixels in amplitude and depth images of different sizes. For clarity of illustration below, a non-limiting assumption is made that the amplitude and depth images are aligned and have the same size. Embodiments, however, are not limited solely to use with amplitude and depth images having the same size and alignment.

Figure 3:
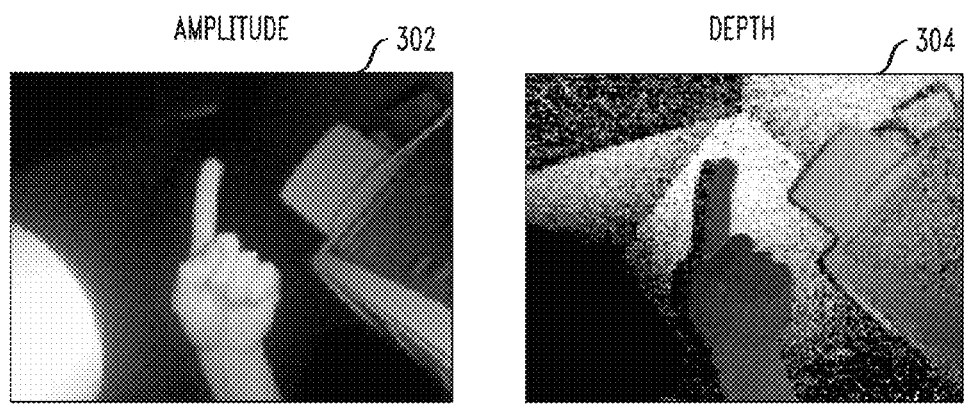
FIG. 3 shows an example of amplitude and depth images.

FIG. 3 shows an example of an amplitude image 302 and a depth image 304. In the FIG. 3 images, a left hand is shown in a pointing-finger pose. These images also show a printer to the right of the left hand in the pointing-finger pose and a portion of a coffee mug to the left of the left hand in the pointing-finger pose.

In block 203-1, the input depth image is stored in depth history buffer 230-1. Similarly, the input amplitude image is stored in amplitude history buffer 230-2 in block 203-2. In some embodiments, one or both of the history buffers 230 store a single previous frame. In other embodiments, one or both of the history buffers 230-1 and 230-2 store a history of two or more respective depth and/or amplitude frames. The history buffers 230 may comprise circular containers. As described above, some embodiments may not utilize depth images. Thus, elements 203-1, 230-1 and 206 in FIG. 2 are shown as dashed boxes.

As described above, a foreground ROI is estimated in block 202 using the amplitude image and optionally the depth image. The foreground ROI may be implemented as a binary mask in which pixels within the foreground ROI have a certain binary value, illustratively a logic 1 value, and pixels outside the foreground ROI have the complementary binary value, illustratively a logic 0 value. Block 202 may utilize threshold logic to define the foreground ROI. In some embodiments, all pixels in the amplitude image having associated amplitude values greater than a defined amplitude threshold and all pixels in the depth image having associated depth values within a defined depth threshold are assigned the logic 1 value and included in the foreground ROI.

For both ToF imagers and infrared imagers with active lighting, the closer an object is to the imager, the higher the amplitude values of the corresponding image pixels, not taking into account reflecting materials. Accordingly, in some embodiments the amplitude threshold is set so as to select pixels with relatively high amplitude values allowing one to preserve close objects from an imaged scene and to eliminate far objects from the imaged scene. It should be noted that for ToF imagers, pixels with lower amplitude values tend to have higher error in their corresponding depth values, and so removing pixels with low amplitude values additionally protects one from using incorrect depth information in some embodiments.

Various other techniques for constructing the foreground ROI mask may be used in other embodiments, including the techniques described in the above-referenced Russian Patent Application No. 2013135506.

Figure 4:
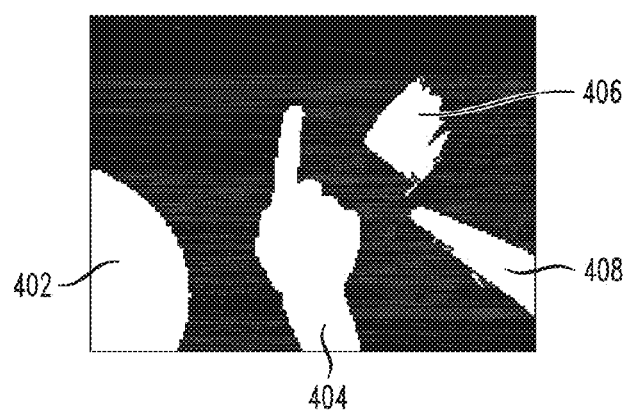
FIG. 4 shows an example of a region of interest mask generated from the amplitude and depth images of FIG. 3.

FIG. 4 shows an example of a foreground ROI mask generated in block 202 from the amplitude image 302 and depth image 304 shown in FIG. 3. The foreground ROI mask in FIG. 4 includes objects 402, 404, 406 and 408. In some embodiments, foreground processing is used to distinguish between static and dynamic objects in the foreground ROI. As an example, in these embodiments the foreground processing is designed to identify objects 402, 406 and 408 as static objects, where object 402 is the aforementioned coffee mug and objects 406 and 408 are portions of the aforementioned printer shown in the amplitude image 302 and depth image 304. In some embodiments it is advantageous to remove and distinguish such static objects from dynamic objects such as object 404, the aforementioned left hand in the pointing-finger hand pose, for subsequent processing and GR.

The FIG. 2 process continues with segmenting the foreground ROI into blobs in block 204. Blobs are an example of what is more generally referred to herein as segments of the foreground ROI. Each blob is a continuous section of pixels within the foreground ROI. Various techniques may be utilized for segmenting the foreground ROI into a plurality of blobs. In some embodiments, the foreground ROI is separated into K blobs, where K is a constant, e.g., K=200. In other embodiments, K is a variable selected so as to keep approximately the same number of pixels in each blob. For example, K=[area(ROI)/areaSegment]+1, where areaSegment is a predefined constant, e.g., areaSegment=100, and the square brackets [ ] denote taking the integral part of a decimal number. Segmenting the foreground ROI in block 204 separates the foreground ROI into small areas, which typically have similar amplitude and optionally depth values. Various image segmentation techniques may be used in block 204, including k-means clustering and statistical region merging (SRM) algorithms. Hereinafter B(k) is used to denote the kth blob resulting from the segmentation in block 204, where k=1, 2, ... K.

Figure 5:
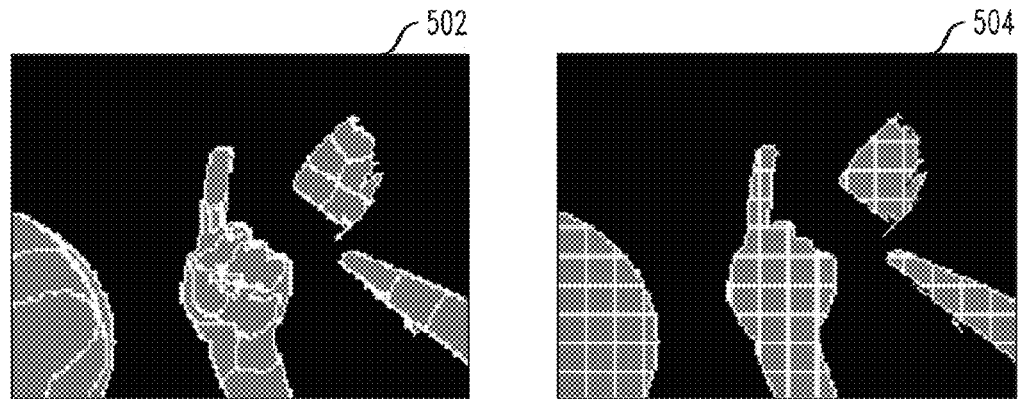
FIG. 5 shows examples of region of interest segmentation of the region of interest mask of FIG. 4.

FIG. 5 shows two examples of a segmented foreground ROI. Image 502 shows segmentation of the foreground ROI mask into a number of blobs of uneven size. One or more of the above-described segmentation techniques may be utilized to generate the segmentation shown in image 502. Image 504 shows an alternate segmentation technique used in some embodiments where the foreground ROI mask is split into areas defined by a rectangular grid. Embodiments, however, are not limited solely to use with rectangular grids. Instead, various other types of grids may be used.

In blocks 206 and 208, per-pixel statistics are determined from the depth and amplitude information stored in the history buffers 230-1 and 230-2, respectively. In block 206, the temporal mean and standard deviation of depth values for the pixels of the depth image(s) stored in depth history buffer 230-1 are calculated. These calculations may be performed using an exponential infinite impulse response (IIR) filter with a coefficient $0 < \alpha_D < 1$ and buffers $meanD_1$ and $meanD_2$. For each pixel (i,j) and a frame length of 1 in the depth history buffer 230-1, the values stored in buffers $meanD_1$ and $meanD_2$ are calculated as follows $$meanD_1(i,j) = (meanD_1(i,j)*1-\alpha_D)) + (D(i,j)*\alpha_D)$$

$$meanD_2(i,j) = (meanD_2(i,j)*(1-\alpha_D)) + ((D(i,j))^2*\alpha_D)$$

where D(i,j) is the depth value for pixel (i,j) and $meanD_1$ is the estimate of mean depth for pixel (i, j). Using the values $meanD_1$ and $meanD_2$ stored in the respective buffers, the standard deviation of the depth value $std_D$ for pixel (i,j) is estimated according to $$std_D(i,j) = \sqrt{(meanD_2(i,j) - (meanD_1(i,j))^2)}.$$

If the depth history buffer 230-1 stores more than one frame, the estimation of temporal mean and standard deviation of depth values in block 206 may be performed as follows. Let depthHL denote the length of the depth history buffer 230-1, or the number of frames stored in the depth history buffer 230-1. The temporal mean and standard deviation of the depth values may thus be calculated using rectangular averaging according to $$sumD_1(i, j) = sumD_1(i, j) + D_n(i, j) - D_{n-depthHL}(i, j)$$

$$sumD_2(i, j) = sumD_2(i, j) + (D_n(i, j))^2 - (D_{n-depthHL}(i, j))^2$$

$$meanD_1(i, j) = \frac{sumD_1(i, j)}{depthHL}$$

$$std_D(i, j) = \sqrt{\left(\frac{sumD_2(i, j)}{depthHL}\right) - (meanD_1(i, j))^2}$$

where $D_l(i,j)$ denotes the depth of pixel (i,j) for frame l, where l=n denotes the current frame and depth of frames with indexes n-1, n-2, ..., n-depthHL stored in the depth history buffer 230-1. The estimates $sumD_1(i,j)$ and $sumD_2(i,j)$ are stored in respective buffers.

In a similar manner, the estimates of temporal mean and standard deviation of amplitude values may be calculated using an IIR filter with a coefficient $0 < \alpha_A < 1$ and buffers meanA$_1$ and meanA$_2$. The values $\alpha_A$ and $\alpha_D$ may be different. For each pixel (i,j) and a frame length of 1 in the amplitude history buffer 230-2, the values stored in buffers meanA$_1$ and meanA$_2$ are calculated as follows $$meanA_1(i,j)=(meanA_1(i,j)*(1-\alpha_A))+(A(i,j)*\alpha_A)$$

$$meanA_2(i,j)=(meanA_2(i,j)*(1-\alpha_A))+((A(i,j))^2*\alpha_A)$$

where A(i,j) is the amplitude value for pixel (i,j) and meanA$_1$ is the estimate of mean amplitude for pixel (i,j). Using the values meanA$_1$ and meanA$_2$ from the respective buffers, the standard deviation of the depth value std$_A$ for pixel (i,j) is estimated according to $$std_A(i,j)=\sqrt{meanA_2(i,j)-(meanA_1(i,j))^2}$$

If the amplitude history buffer 230-2 stores more than one frame, the estimation of temporal mean and standard deviation of amplitude values in block 208 may be performed as follows. Let amplitudeHL denote the length of the amplitude history buffer 230-2, or the number of frames stored in the amplitude history buffer 230-2. The temporal mean and standard deviation of the amplitude values may thus be calculated using rectangular averaging according to $$sumA_1(i,j) = sumA_1(i,j) + A_n(i,j) - A_{n-amplitudeHL}(i,j)$$

$$sumA_2(i,j) = sumA_2(i,j) + (A_n(i,j))^2 - (A_{n-amplitudeHL}(i,j))^2$$

$$meanA_1(i,j) = \frac{sumA_1(i,j)}{amplitudeHL}$$

$$std_A(i,j) = \sqrt{\left(\frac{sumA_2(i,j)}{amplitudeHL} - (meanA_1(i,j))^2\right)}$$

where A$_l$(i, j) denotes the amplitude of pixel (i, j) for frame l, where l=n denotes the current frame and amplitude of frames with indexes n−1, n−2, ..., n−amplitudeHL stored in the amplitude history buffer 230-2. It is important to note that various other techniques may be used for estimating per-pixel depth and amplitude mean and standard deviation values in other embodiments. In addition, various other types of per-pixel depth and amplitude statistics may be used in other embodiments. The pixel statistics determined in blocks 206 and 208 are passed to block 214, which will be described in further detail below.

The FIG. 2 process continues with block 210 where, for each blob determined in block 204, the lateral mean and standard deviation value of amplitude and optionally depth values are estimated. In some embodiments, the processing in block 210 is performed by calculating an arithmetic mean value of amplitude and amplitude squared, along with the corresponding amplitude standard deviation of the points in a given blob. Optionally, the depth and depth squared values along with the corresponding depth standard deviation are calculated for the points in a given blob. The per-blob amplitude mean, amplitude standard deviation, depth mean and depth standard deviation values are denoted herein as meanA$_L$(k), stdA$_L$(k), meanD$_L$(k) and stdD$_L$(k), respectively, wherein L refers to lateral and k is the index of the blob.

In other embodiments, the processing in block 210 may be performed using alternate foreground ROI segmentation wherein the segmentation of the foreground ROI is performed by listing individual pixels in the foreground ROI and estimating lateral statistics based on the neighborhood areas of each pixel. As an example, an M×M square around a pixel intersected with the foreground ROI may be used as the neighborhood area for a given pixel, where M is an integer value greater than 1. This approach saves computational time relative to the blob segmentation techniques described above, but requires more computational resources for estimating statistics.

In block 212, blobs are classified based on the blob statistics estimated in block 210. Block 212 uses classification patterns 205-1 for blob classification. The classification patterns 205-1 in some embodiments are trained on specially recorded and marked up data. Such training is performed based on movies or other sequences of frames or images with recorded objects of known materials. In the movies or other sequences, the objects of known material are slowly moved to cover a defined range of possible distances, locations of the object within a frame, angles of reflective surfaces, etc. To simplify the training process, in some embodiments only a single object made of one material is trained at a given time. In other embodiments, training may involve multiple objects in a given frame with manual or semi-automatic markup of objects within the frames. For each such movie or training sequence, the processing in blocks 204 and 210 is performed. The results of such processing are stored as the patterns 205-1. Human hands, clothing, controllers, etc. are examples of objects which may be trained in some embodiments.

In other embodiments, the classification patterns 205-1 may be provided by an external source, are predefined, or are trained using techniques other than those described above.

Using the classification patterns 205-1, block 212 classifies blobs as belonging to one of a plurality of material classes. Different materials have different reflective properties. For example, glass, plastic, wood, paper, etc. have different reflective properties. In some embodiments, two patterns are used—skin materials and non-skin materials. In such embodiments, respective non-skin materials may correspond to different classification patterns. More generally, non-skin materials do not correspond to one or more defined skin patterns.

In other embodiments, block 212 may classify blobs as belonging to one of three or more material classes or one of two material classes other than skin and non-skin material. By way of example, in some GR systems dynamic objects of interest may be objects other than those objects classified as skin material. For example, users may wear gloves of special material or utilize one or more controllers, wands, etc. to perform gestures. Thus, in some embodiments objects other than those classified as skin material may be considered objects of interest for subsequent processing, and the processing in block 212 may be altered so as to classify blobs as belonging to one or more other materials of interest in addition to or in place of skin material.

A variety of classification techniques may be used in block 212, including but not limited to Gaussian Mixture Models (GMMs), neural networks, random forest, etc. Different subsets of the parameters meanA$_L$(k), stdA$_L$(k), meanD$_L$(k) and stdD$_L$(k) may be used as vectors of classification features in different embodiments.

Block 212 passes material classification of the blobs to block 216, which will be described in further detail below. As discussed above, in some embodiments the material classification in block 212 involves classifying each blob as either skin material such as a hand or non-skin material. Skin material such as a hand is an example of a dynamic foreground object, while certain non-skin materials are examples of static foreground objects. By way of example, in the foreground ROI mask shown in FIG. 4, object 404 is classified as skin material or a dynamic object, while objects 402, 406 and 408 are classified as non-skin material or static objects.

In block 214, each pixel of the foreground ROI is classified as belonging to a static or dynamic foreground object. Block 214 uses pixel statistics calculated in blocks 208 and optionally block 206. Block 214 classifies foreground ROI pixels into ones that correspond to a moving foreground object such as a hand and other objects which correspond to static or non-moving foreground objects. Classification of pixels (i,j) from the foreground ROI is made based on a subset of the features meanA(i,j), $std_A$(i,j), meanD(i,j) and $std_D$(i,j) described above. In some embodiments all pixels are classified in blocks 206 and 208 while block 214 classifies only those pixels from the foreground ROI.

A variety of classification techniques may be used in block 214, including but not limited to GMMs, neural networks, random forest, etc. The processing in blocks 212 and 214 may use the same or different classification techniques. In some embodiments, multiple classification techniques are used in one or both of blocks 212 and 214. As one example, block 214 may utilize a fast-working random forest classification technique while block 212 uses GMM-based classification.

Block 214 utilizes patterns 205-2 for static and dynamic objects. One or more of the training processes described above with respect to patterns 205-1 may similarly be used to train the patterns 205-2, with the difference being that the features used for training patterns 205-2 are temporal per-pixel statistics while the features used for training patterns 205-1 are lateral per-blob statistics. In some embodiments, different training processes are used for training patterns 205-1 and 205-2.

The FIG. 2 process continues with block 216, where blobs are classified as belonging to hands or static foreground objects based on the material and pixel classifications determined in blocks 212 and 214, respectively. More generally, block 216 in some embodiments classifies blobs or portions thereof as corresponding to a dynamic foreground object or as corresponding to a static foreground object. Block 216 passes the blob classification(s) to block 218, which excludes blobs or portions thereof corresponding to static foreground objects from the foreground ROI. In some embodiments, block 218 refines the foreground ROI mask determined in block 202, and provides as output a refined foreground ROI mask. This refined foreground ROI mask may be passed to one or more other processing subsystems of the image processor 102, the GR applications 118, the image destination(s) 113, etc.

Figure 6:
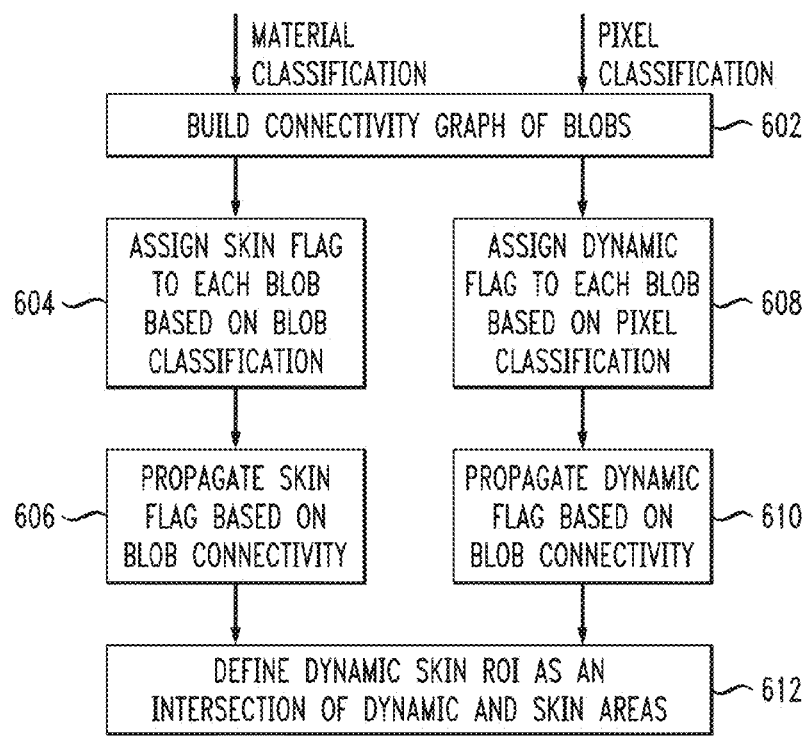
FIG. 6 is a flow diagram illustrating a blob classification process performed by the foreground processing module in the image processor of FIG. 1.

FIG. 6 shows a detailed example of the processing which may be performed in block 216 in some embodiments. Block 602 receives as input the material and pixel classifications determined in blocks 212 and 214, respectively, and builds a blob connectivity graph G. The blob connectivity graph G is a non-oriented graph of blobs. Each blob B(k) corresponds to a vertex of the blob connectivity graph G. The decision of whether two blobs are considered to be connected is made in accordance with a number of decision rules. For example, given two blobs denoted B(k) and B(o), examples of such decision rules include:

1. B(k) and B(o)>x neighbor boundary pixels, where x is a defined constant e.g., x=1.
2. $|meanA_L(k) - meanA_L(o)| \leq c_A*(stdA_L(k)+stdA_L(o))$, where $c_A$ is a positive constant $0<c_A<12$, e.g., $c_A=5$.
3. $|meanD_L(k) - meanD_L(o)| \leq c_D*(stdD_L(k)+stdD_L(o))$, where $c_D$ is a positive constant $0<c_D<12$, e.g., $c_D=3$.
4. B(k) material=B(o) material.

In some embodiments, the constants $c_A$ and $c_D$ are tuned such that blobs belonging to the same object are likely to be connected but blobs from different objects are connected if and only if they are in close spatial proximity to one another and are likely to be made from the same material. In some instances, blobs belonging to the same object are not connected due to the non-homogeneity of various objects.

In some embodiments, the blobs B(k) and B(o) are considered to be connected with non-oriented graph edge G(i,j) if the following condition is met using logical AND/OR syntax: Rule 1 AND ((Rule 2 AND Rule 3) OR ((Rule 2 OR Rule 3)) AND Rule 4). Various other alternative conditions may be used in other embodiments, including by way of example: Rule 1 AND Rule 2 AND Rule 3; or Rule 1 AND (Rule 2 OR Rule 3). In addition, the decision rules described above are presented by way of example only. Other embodiments may use various other decision rules in place of or in addition to one or more of the above-described decision rules.

Figure 7:
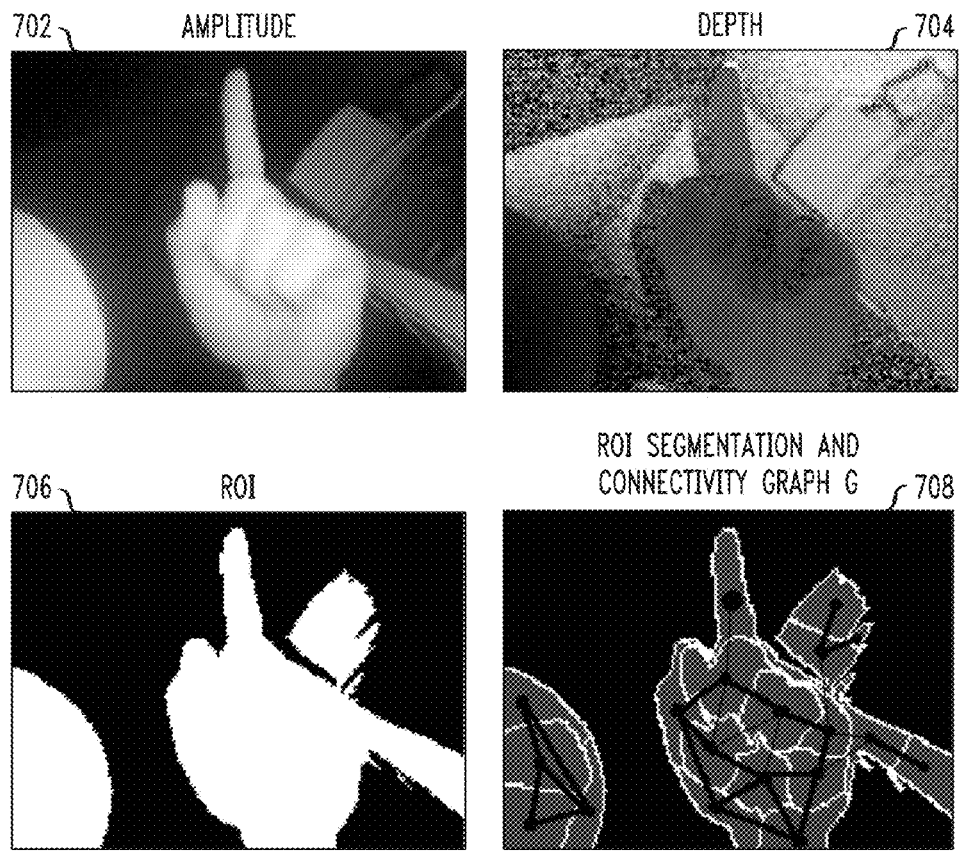
FIG. 7 shows an example of construction of a blob connectivity graph.

FIG. 7 shows an example of construction of a blob connectivity graph G. Given input amplitude image 702 and depth image 704, a foreground ROI 706 is estimated. The amplitude image 702 and depth image 704 are similar to the amplitude image 302 and depth image 304 in FIG. 3, although the left hand pointing-finger pose in amplitude image 702 and depth image 704 is closer than in amplitude image 302 and depth image 304. The foreground ROI 706 is segmented and the blob connectivity graph G is constructed as shown in image 708. In the connectivity graph G shown in image 708, adjacent blobs are shown with thin black line edges while connected blobs are shown with thick black line edges.

In block 604, a skin flag is assigned to each blob based on the blob classification. The skin flag in some embodiments is a binary flag skin(i) set to 1 if the blob is classified as belonging to skin material and 0 otherwise. In step 606, the skin flag is propagated based on blob connectivity. An example of pseudocode for skin flag propagation in block 606 for the connectivity graph G is as follows:

```
num_skin_blobs = sum(skin(i), i=1..K)
do
    num_skin_blobs_prev = num_skin_blobs
    for each edge G(i,j)
        if skin(i)==1 and skin(j)==0
            set skin(j)=1
            num_skin_blobs++
        end
    end
while num_skin_blobs != num_skin_blobs_prev
```

Figure 8:
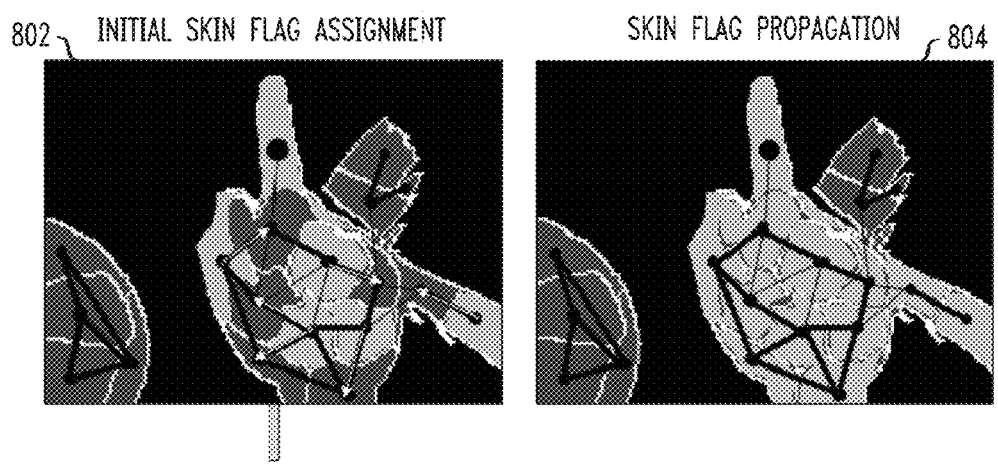
FIG. 8 shows an example of skin flag propagation.

FIG. 8 illustrates an example of skin flag propagation in block 606. Image 802 shows the blob connectivity graph G after initial skin flag assignment in block 604. Blobs shaded light gray are assigned skin flag 1 while blobs shaded dark gray are assigned skin flag 0. Again, adjacent blobs are shown with thin black line edges while connected blobs are shown with thick black line edges. Image 804 illustrates skin flag propagation in the blob connectivity graph G after the processing in block 606. As shown, blobs corresponding to the left hand pointing finger pose in the source amplitude image 702 and depth image 704 are marked with the skin flag 1 after propagation. This propagation, however, may result in the classification of one or more blobs as skin material which are not in fact skin. For example, in image 804 portions of the printer from the amplitude image 702 and depth image 704 are assigned skin flag 1 based on the skin flag propagation in the blob connectivity graph G.

In block 608, each blob is assigned a dynamic flag based on pixel classification. The dynamic flag in some embodiments is a binary flag dynamic(i) set to 1 if the blob is classified as belonging to a dynamic object and 0 otherwise. A variety of techniques may be utilized for determining whether a blob is classified as dynamic. As one example, a blob is considered dynamic if a ratio of the area of blob pixels recognized by block 214 as dynamic ones relative to the total area of the blob is greater than some predefined threshold $th_{ratio}$, $0<th_{ratio}<1$, e.g., $th_{ratio}=0.5$. As another example, a blob is considered dynamic if a number of pixels in the blob recognized by block 214 as being dynamic exceeds a threshold $th_{num}$, $th_{num}>0$, e.g., $th_{num}=10$. In some embodiments, combinations of the above conditions are used to determine whether a blob is considered dynamic. Various other conditions may be used in other embodiments.

In block 610, the dynamic flag is propagated based on blob connectivity. An example of pseudocode for dynamic flag propagation in block 610 for the connectivity graph G is as follows:

```
num_dynamic_blobs = sum(dynamic(i), i=1..K)
do
    num_dynamic_blobs_prev = num_dynamic_blobs
    for each edge G(i,j)
        if dynamic(i)==1 and dynamic(j)==0
            set dynamic(j)=1
            num_dynamic_blobs++
        end
    end
while num_dynamic_blobs != num_dynamic_blobs_prev
```

In block 612, dynamic skin area(s) of the foreground ROI are defined as intersections of the dynamic and skin areas determined in blocks 606 and 610. A dynamic skin flag is assigned to blobs in the connectivity graph G. The dynamic skin flag in some embodiments is a binary flag dynamic_skin set to 1 for a blob i if dynamic(i)=1 and skin(i)=1. Otherwise, dynamic_skin is set to 0.

FIG. 9 illustrates assignment of the dynamic and dynamic_skin flags. Image 902 shows the foreground ROI mask after skin flag propagation. Blobs assigned the skin flag 1 are shaded light gray while blobs assigned skin flag 0 are shaded dark gray. Image 904 shows the foreground ROI mask after dynamic flag propagation. Blobs assigned the dynamic flag 1 are shaded medium gray while blobs assigned dynamic flag 0 are shaded dark gray. As shown in FIG. 9, the portions of the printer in the amplitude image 702 and depth image 704 which were assigned the skin flag during skin flag propagation are not assigned the dynamic flag during dynamic flag propagation. Image 906 shows the foreground ROI mask after the dynamic skin flag assignment, where blobs assigned dynamic_skin flag 1 are white and blobs assigned dynamic_skin flag 0 are shaded dark gray.

In some embodiments, material classification in block 212 and subsequent skin flag assignment and propagation in blocks 604 and 606 may be omitted. In these embodiments, the resulting refined foreground ROI mask is equal to the foreground ROI mask after dynamic flag propagation in block 610. This approach may be advantageous in certain systems where the objective is to identify moving objects of more than one material type, or cases in which it is assumed that moving objects, regardless of material type, are objects of interest for future processing in GR applications 118. This approach, however, is not able to distinguish between foreground dynamic objects of different materials.

It is to be appreciated that the particular processing blocks used in the embodiments of FIGS. 2 and 6 are exemplary only, and other embodiments can utilize different types and arrangements of image processing operations. For example, the particular techniques used to estimate the static and dynamic foreground, and the particular techniques used for segmentation, material and pixel classification, segment classification, etc., can be varied in other embodiments. Also, as noted above, one or more processing blocks indicated as being executed serially in the figure can be performed at least in part in parallel with one or more other processing blocks in other embodiments.

Embodiments of the invention provide particularly efficient techniques for estimating and eliminating certain foreground information in an image. For example, these techniques can provide significantly better differentiation between dynamic foreground objects of interest and static foreground objects within amplitude and depth images from SL or ToF cameras or other types of imagers. Accordingly, use of modified images having static foreground information estimated and eliminated in the manner described herein can significantly enhance the effectiveness of subsequent image processing operations such as feature extraction, gesture recognition and object tracking.

The techniques in some embodiments can operate directly with raw image data from an image sensor of a depth imager, thereby avoiding the need for denoising or other types of preprocessing operations. Moreover, the techniques exhibit low computational complexity and can support many different noise models as well as different types of image sensors.

It should again be emphasized that the embodiments of the invention as described herein are intended to be illustrative only. For example, other embodiments of the invention can be implemented utilizing a wide variety of different types and arrangements of image processing circuitry, modules and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method comprising the steps of:
obtaining one or more images;
estimating a foreground region of interest from the one or more images;
determining a plurality of segments of the foreground region of interest;
calculating amplitude statistics for respective ones of the plurality of segments;
classifying respective segments as being respective portions of static foreground objects or as being respective portions of dynamic foreground objects based at least in part on the calculated amplitude statistics and one or more defined patterns for known static and dynamic objects; and
removing one or more segments classified as static foreground objects from the foreground region of interest;
wherein the steps are implemented in an image processor comprising a processor coupled to a memory.

2. The method of claim 1 further comprising calculating depth statistics for respective ones of the plurality of segments, wherein classifying respective segments as being respective portions of static foreground objects or as being respective portions of dynamic foreground objects is based at least in part on the calculated amplitude statistics, the calculated depth statistics and the one or more defined patterns for known static and dynamic objects.

3. The method of claim 1 wherein estimating the foreground region of interest comprises generating a binary foreground region of interest mask in which pixels within the foreground region of interest all have a first binary value and pixels outside the foreground region of interest all have a second binary value complementary to the first binary value.

4. The method of claim 3 wherein:
the one or more images comprise a amplitude image and a corresponding depth image;
respective pixels in the amplitude image having amplitude values above a defined threshold are assigned the first binary value and respective pixels having amplitude values below the defined threshold are assigned the second binary value; and
respective pixels in the depth image having a depth within a defined threshold are assigned the first binary value and respective pixels having a depth outside the defined threshold are assigned the second binary value.

5. The method of claim 1 wherein determining the plurality of segments of the foreground region of interest comprises one of:
segmenting the foreground region of interest into a predefined constant number of segments;
segmenting the foreground region of interest into segments comprising respective groups of pixels such that respective numbers of pixels in each group of pixels is approximately the same; and
segmenting the foreground region of interest into areas defined by a rectangular grid.

6. The method of claim 1 wherein obtaining the one or more images comprises obtaining a amplitude image, estimating per-pixel amplitude statistics for each pixel of the amplitude image, and storing the per-pixel amplitude statistics in a amplitude history buffer.

7. The method of claim 6 wherein calculating amplitude statistics for respective ones of the plurality of segments is based on an analysis of the per-pixel amplitude statistics of pixels within the respective segments.

8. The method of claim 7 wherein the amplitude statistics of a given segment comprise an arithmetic mean value of per-pixel amplitude values of pixels within the given segment and a standard deviation of the arithmetic mean value.

9. The method of claim 1 further comprising classifying respective segments as being skin material or as being non-skin material based at least in part on the calculated amplitude statistics and one or more defined patterns for skin and non-skin materials.

10. The method of claim 9 further comprising removing one or more segments classified as non-skin material from the foreground region of interest.

11. The method of claim 9 further comprising classifying one or more of the plurality of segments of the foreground region of interest as a hand region of interest responsive to classifying the one or more segments as dynamic objects and classifying the one or more objects as being skin material.

12. The method of claim 11 further comprising removing from the foreground region of interest segments not classified as the hand region of interest.

13. The method of claim 9 further comprising:
building a connectivity graph for the plurality of segments;
assigning a skin flag to each segment, wherein the skin flag identifies whether respective segments are classified as skin material or non-skin material;
propagating the skin flag based on the connectivity graph to define one or more skin areas of the foreground region of interest;
assigning a dynamic flag to each segment, wherein the dynamic flag identifies whether respective segments are classified as being respective portions of static foreground objects or as being respective portions of dynamic foreground objects;
propagating the dynamic flag based on the connectivity graph to define one or more dynamic areas of the foreground region of interest; and
defining dynamic skin areas of the foreground region of interest as intersections of the skin and dynamic areas.

14. The method of claim 13 further comprising:
classifying at least a portion of the dynamic skin area as a hand region of interest; and
removing from the foreground region of interest segments not classified as the hand region of interest.

15. An apparatus comprising:
an image processor comprising image processing circuitry and an associated memory;
wherein the image processor is configured to implement a foreground processing module utilizing the image processing circuitry and the memory;
wherein the foreground processing module is configured:
to obtain one or more images;
to estimate a foreground region of interest from the one or more images;
to determine a plurality of segments of the foreground region of interest;
to calculate amplitude statistics for respective ones of the plurality of segments;
to classify respective segments as being respective portions of static foreground objects or as being respective portions of dynamic foreground objects based at least in part on the calculated amplitude statistics and one or more defined patterns for known static and dynamic objects; and
to remove one or more segments classified as static foreground objects from the foreground region of interest.

16. The apparatus of claim 15 wherein the foreground processing module is further configured:
to classify respective segments as being skin material or as being non-skin material based at least in part on the calculated amplitude statistics and one or more defined patterns for skin and non-skin materials; and
to remove one or more segments classified as non-skin material from the foreground region of interest.

17. The apparatus of claim 16 wherein the foreground processing module is further configured:
to classify one or more of the plurality of segments of the foreground region of interest as a hand region of interest responsive to classifying the one or more segments as dynamic objects and classifying the one or more objects as being skin material; and
to remove from the foreground region of interest segments not classified as the hand region of interest.

18. The apparatus of claim 15 wherein the one or more images comprise a amplitude image and a corresponding depth image.

19. The apparatus of claim 18 wherein respective pixels in the amplitude image having amplitude values above a defined threshold are assigned a first binary value and respective pixels having amplitude values below the defined threshold are assigned the second binary value.

20. The apparatus of claim 19 wherein respective pixels in the depth image having a depth within a defined threshold are assigned the first binary value and respective pixels having a depth outside the defined threshold are assigned a second binary value.

* * * * *